United States Patent
Qin (10) Patent No.: US 9,507,174 B2
(45) Date of Patent: Nov. 29, 2016

(54) SPATIAL FOCAL FIELD TYPE GLASSES DISPLAY

(71) Applicant: Beijing ANTVR Technology Co., LTD., Beijing (CN)

(72) Inventor: Zheng Qin, Beijing (CN)

(73) Assignee: BEIJING ANTVR TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/500,514

(22) Filed: Sep. 29, 2014

(65) Prior Publication Data

US 2015/0015814 A1 Jan. 15, 2015

Related U.S. Application Data

(63) Continuation of application No. PCT/CN2012/001415, filed on Oct. 23, 2012.

(30) Foreign Application Priority Data

Apr. 23, 2012 (CN) .......................... 2012 1 0119666

(51) Int. Cl.
*G02F 1/1335* (2006.01)
*G02C 11/00* (2006.01)
*G02B 27/22* (2006.01)
*G02B 27/01* (2006.01)
(Continued)

(52) U.S. Cl.
CPC ................. *G02C 11/10* (2013.01); *G02B 5/30* (2013.01); *G02B 27/017* (2013.01);
(Continued)

(58) Field of Classification Search
CPC ... G02C 11/10; G02C 7/04; G02F 1/133528; G02B 27/2214; G02B 27/017; G02B 2027/0127; G02B 2027/0134; G02B 2027/0178; G02B 27/0172; G02B 5/30; G02B 2027/0118
USPC ....................................................... 349/13–14
See application file for complete search history.

(56) References Cited

U.S. PATENT DOCUMENTS 6,879,443 B2 * 4/2005 Spitzer ............... G02B 27/0081
345/8
2008/0278640 A1 * 11/2008 Ijzerman .............. G02B 5/0242
349/15

(Continued)

FOREIGN PATENT DOCUMENTS

CN 1813213 A 8/2006
CN 1890988 A 1/2007

(Continued)

OTHER PUBLICATIONS

State Intellectual Property Office of the P.R. China (ISR/CN), "International Search Report for PCT/CN2012/001415", China, Jan. 31, 2013.

*Primary Examiner* — Charles Chang
(74) *Attorney, Agent, or Firm* — Locke Lord LLP; Tim Tingkang Xia, Esq.

(57) ABSTRACT

A spatial focal field type glasses display product can present virtual images at different distances simultaneously. The product is a frame type glasses or corneal contact lens and comprises a projection component and a display control device. The projection component comprises a plurality of projection units, each projection unit projects a plurality of elementary beams. The elementary beams projected by the same projection unit diverge and do not intercept with each other. The elementary beams projected by different projection units intersect near the retina after passing through the crystalline lens. The intersection point is a cluster focus. All cluster focuses form a spatial focal field which envelop the retina. When the diopter of the crystalline lens changes, the spatial focal field displaces and deforms accordingly, so different cluster focuses fall on the retina to be seen clearly, while the other cluster focuses tend to disperse and cannot be seen clearly.

20 Claims, 12 Drawing Sheets

(51) Int. Cl.
  *G02B 5/30* (2006.01)
  *G02C 7/04* (2006.01)
(52) U.S. Cl.
  CPC ..... *G02B 27/0172* (2013.01); *G02B 27/2214* (2013.01); *G02F 1/133528* (2013.01); *G02B 2027/0118* (2013.01); *G02B 2027/0127* (2013.01); *G02B 2027/0134* (2013.01); *G02B 2027/0178* (2013.01); *G02C 7/04* (2013.01)

(56) References Cited

U.S. PATENT DOCUMENTS

2011/0051091 A1* 3/2011 Song ................. G02B 27/0172
                                                                  353/7
2011/0317272 A1* 12/2011 Horikawa ............... G09F 19/18
                                                                  359/619
2012/0127570 A1*  5/2012 Sakai ................. G02B 27/2214
                                                                  359/463
2013/0242402 A1*  9/2013 Konig ................. G02B 3/0087
                                                                  359/630

FOREIGN PATENT DOCUMENTS

| | | |
|---|---|---|
| CN | 101788711 A | 7/2010 |
| CN | 102132193 A | 7/2011 |
| CN | 102193196 A | 9/2011 |
| JP | 8-5957 | 1/1996 |
| JP | 2010-271505 A | 12/2010 |

* cited by examiner

SPATIAL FOCAL FIELD TYPE GLASSES DISPLAY

CROSS REFERENCE TO RELATED APPLICATIONS

This is a continuation application of PCT Application No. PCT/CN2012/001415, titled "Three-dimensional Focal Field Spectacles Display," filed Oct. 23, 2012, which is based upon and claims the benefit of priority from Chinese Application No. 201210119666.X, titled "Small Hole Projection Type Near-eye Display," filed on Apr. 23, 2012. The entire contents of the above-referenced applications are incorporated herein by reference.

TECHNICAL FIELD

The present invention relates to a glasses display which is also known as the head mounted display (HMD) or near-eye display, especially relates to a glasses display which can present virtual images at different distances simultaneously.

BACKGROUND OF THE INVENTION

Focal distance of human eyes is from 10 cm to infinity, so the human eyes cannot see any objects within a distance of 10 cm. In order for the human eyes to clearly see the contents displayed by the display device which is very close to the eyes, there are a lot of solutions in the field of glasses displays.

The glasses display products at present mainly comprise transmissive type and non-transmissive type. The transmissive type glasses display allows ambient light to pass through the glasses to enter human eyes, so as to integrate the virtual images be displayed with the outside landscape.

The images displayed by the glasses display products available in the market are all in the same virtual image plane, so the function of displaying virtual images at different distances simultaneously cannot be achieved.

One of patent documents in the prior art discloses that a glasses display which is made by zooming lens scanning method can display virtual images at different distances at different times. When the scanning speed is very fast and within the time interval which the human eyes cannot distinguish, it can be considered to realize displaying the virtual images at different distances simultaneously. However, this solution needs to adopt lens of which curvature can be controlled by voltage, so the structure is complicated, and still not really realize that the virtual images can be displayed at different distances simultaneously.

The largest view angle of the human eyes is around 120°, but the angle range displayed by the existing glasses display is limited by its optical structure, and it is usually only around 50°. Therefore, the experience on immersive visual is poor.

Based on the glasses display products and their shortcomings above, in order to develop a glasses display which can present virtual images at different distances simultaneously, the present invention provide a "spatial focal field type glasses display".

SUMMARY OF THE INVENTION

For the deficiency of the existing technology as above, the technical problem solved by the invention is to provide a solution by which a glasses display can display virtual images at different distances simultaneously, which can be used to produce frame type glasses display or corneal contact lens display.

The present invention is mainly implemented through the following technical solutions:

A spatial focal field type glasses display in a form of frame type glasses or corneal contact lens, comprising a projection component and display control device, wherein the projection component comprises a plurality of projection units, a single projection unit projects a plurality of separated tiny elementary beams to different positions on the crystalline lens, because the elementary beam is extremely tiny, the crystalline lens is used to deflect the elementary beam. Each elementary beam forms a light spot on the retina, namely the light spot of a single elementary beam on the retina. The brightness of a single light spot is not bright enough to be seen clearly. A projection area of a single projection unit on the retina is a single projection circle of the single projection unit on the retina. The projection areas of the adjacent multiple projection units on the retina overlap with each other, thus the light spots generated by different projection units can overlap with each other on the retina, three or more light spots closely overlap with the brightness superimposed to form a clear pixel point, while the light spots overlapping not closely form a blur pixel point, considering the property that the focal length of the human crystalline lens is variable, when the focal length of the crystalline lens changes, the deflection angles after the elementary beams passing through the crystalline lens are different, all light spots redistribute on the retina, so that the clear or blur state of each pixel point in the vision field can be changed.

The projection unit comprises a projection light source unit and a display layer unit. The display layer unit can be any type of dot matrix display device with controllable light transmissive performance. The projection light source unit projects light beams similar to a point light source which are further divided into separate elementary beams with controllable color and brightness after passing through the display layer unit.

The projection light source unit of the projection unit further comprises a beam orientation filter to make the surface light source function more similarly as a point light source.

The projection light source unit of the projection unit further comprises an internal adjusting lens to adjust the divergence of the projection light.

The projection light source unit of the projection unit further comprises a spherical reflecting mirror to use more light beams projected by the projection light source unit.

The display layer unit of projection unit further comprises an external adjusting lens to adjust the divergence of the projection light.

The display layer of single polarization used in the projection unit is a liquid crystal display that only comprises one layer of polarizing plate, and cannot control any external light beams, thus allow external light beams to pass through, the projection light source unit is attached with a partial polarizing plate, so the light beams projected by the light source unit after passing through the partial polarizing plate are transferred into the light beams that can be controlled by the display layer of single polarization, in which way a transmissive type glasses display is produced.

The projection unit utilizes a reflective light source, the light beams is provided by a lateral light source unit, which forms the reflective light source after the light beams pass through a lateral light reflector mirror, the light beams provided by the lateral light source unit can be polarized light beams that are polarized by a lateral polarization film, the polarization of the beams do not change after the beams pass through the lateral light reflector mirror, in this way a transmissive type glasses display is produced by a single polarization display layer unit.

The incoming light beams of the projection unit are parallel light beams or quasi parallel light beams light beams that do not intersect each other, the incoming light beams can firstly pass through the display layer unit and then pass through an exit lens, or can firstly pass through a entrance lens and then pass through the display layer unit, eventually a set of divergent elementary beam are projected. If the incoming light itself is a set of elementary beam which are separated each other and modulated by an external display device, the display layer unit can be omitted and only the exit lens is needed to adjust the divergence of the beam.

The projection component is placed on the side of human eyes, with a reflective type structure, the projected light beams are reflected into the human eyes by a lateral reflector mirror, the lateral reflector mirror can be a flat mirror or non-flat mirror, or total reflective type or half reflective type, when the half reflective type mirror is used, a transmissive type glasses display can be produced.

Preferably, a scene image is divided into a matrix consisting of a plurality of sub-images obtained from different view angles by the spatial focal field type glasses display, each of the sub-images are projected by a plurality of projection units (2) into human eyes, retina images of the sub-images formed on the retina after passing through the crystalline lens overlap with each other, the plurality of the sub-images from the different view angles are arranged so that when the focal length of the crystalline lens of the human eyes change to make the eyes be in different view states, the plurality of retina images of the sub-images from different view angles will overlap on the retina in same center of circles but with different radiuses which vary in a certain scale factor according to the different view states, so that a depth of field effect is generated where distant objects will be blur when the eyes focus on nearby objects and nearby objects will be blur when the eyes focus on distant objects.

The advantages of the present invention comprises but not limited to:

1) It is better to simulate the focused and defocused mechanism to object light beams from different distances of the human eyes, which makes the display present virtual images at different distances simultaneously. The part that can be see clearly will be determined by the diopter of the crystalline lens actively controlled by the human eyes, without any need for additional optical or mechanical components to control the display distance separately.

2) A projection component which is combined with multiple projection units is adopted, which effectively reduces the axial size of the display device along the sight line. It is easy to manufacture a frame type glasses display with lighter and thinner lens, which can be used to produce cornea contact lens display when the size is small enough.

3) A projection component which is combined with multiple projection units is adopted, which can be used to produce a glasses display with big visual angle, even reaching the limit of the human eye visual angle, around 120°, with a good immersive visual experience.

4) No matter whether direct, light-source reflective or mirror reflective type is used, it is easy to produce a transmissive type glasses display according to the corresponding solution. The virtual images can be integrated into the real environment with a right display distance matching the real environment. The advantages of the spatial focal field type glasses display can be utilized well.

The schematic elements and its numbers in figures are as follows:

Projection component 1, projection unit 2, elementary beam 3, crystalline lens 4, retina 5, cluster beam focus 6, spatial focal field 7, actual focus 8, actual focal plane 9, projection light source 10, display layer 11, beam orientation filter 12, internal adjusting lens 13, spherical reflecting mirror 14, external adjusting lens 15, single polarization display layer 16, external light 17, partial polarizing plate 18, lateral light source 19, lateral light reflector mirror 20, lateral polarization film 21, exit lens 22, entrance lens 23, lateral reflector mirror 24, cluster focus gathered on the retina 25, cluster focus gathered after the retina 26, cluster focus gathered in front of the retina 27, light spot of the single elementary beam on the retina 28, projection circle of the single projection unit on the retina 29, corneal contact lens 30, assembly light source 31, parallel light generating lens 32, transmissive type assembly display layer 33, semipermeable mirror 34, reflected type assembly display layer 35.

DETAILED DESCRIPTION OF THE INVENTION

Figure 1:
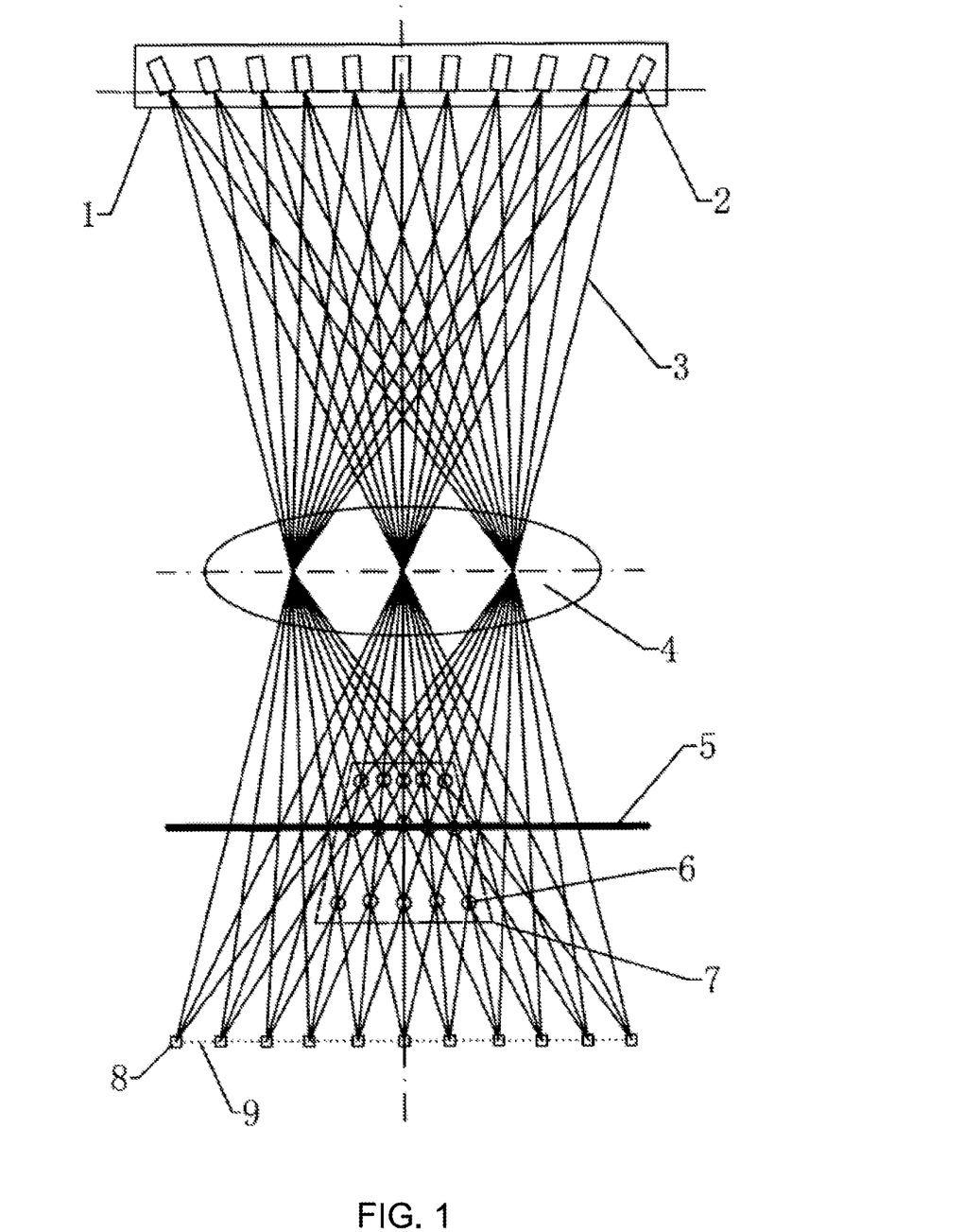
FIG. 1 is a principle schematic figure showing the spatial focal field type glasses display.

With reference to the following exemplary embodiments and the accompanying drawings, the technical solutions of the present invention will be further explained:

The exemplary embodiments:

The display principle is as shown in FIG. 1. A spatial focal field type glasses display comprises a projection component (1) and a display control device. The projection component (1) is located in the lens of the frame type glasses or corneal contact lens, which is placed in front of the human eyes. The projection component (1) comprises a plurality of projection units (2) that are arranged side by side (there is 11 units totally in FIG. 1, but the units can also be arranged extending along the vertical direction of the paper, not shown in the figure). A single projection unit (2) projects a plurality of elementary beams (3 beams in FIG. 1). The three elementary beams (3) focus on the actual focus (8) again after passing through the crystalline lens (4). The actual focuses (8) of different projection units are in the same plane, called as a real focal plane (9). The actual focal plane (9) is located behind the retina (5). As a result of blocking by the retina (5), the actual focal plane (9) does not exist, which is a theoretical plane. Considering that the elementary beams (3) projected by the different projection units (2) will intersect in front of the actual focal plane (9), the cluster beam focus (6) in FIG. 1 is an intersection of three elementary beams (3). These intersections are distributed on a plurality of parallel focal planes in front of and behind the retina (three intersections are shown in the figure). These focal planes define a space known as the spatial focal field (7). The spatial focal field (7) composed of 15 cluster beam focus (6) is shown in FIG. 1.

Figure 2A:
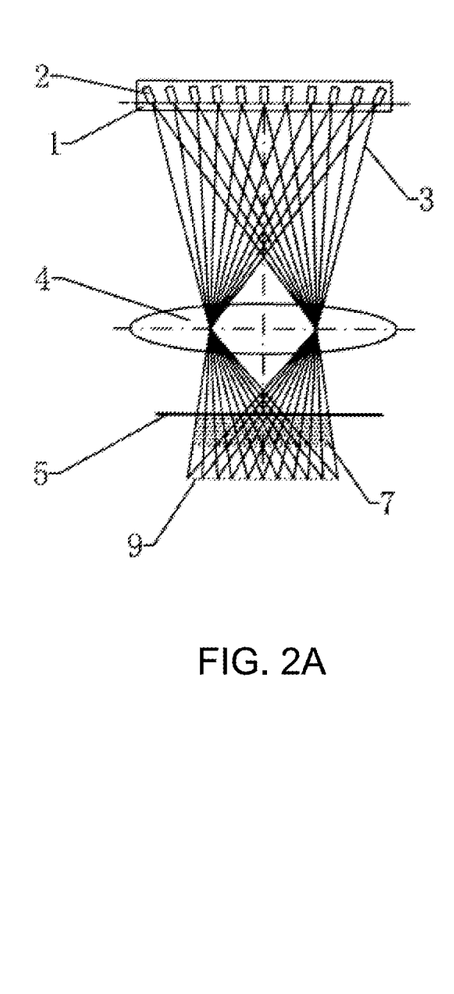
FIGS. 2A, 2B and 2C are schematic figures showing the spatial focal field states with the crystalline lens in different state.
Figure 2B:
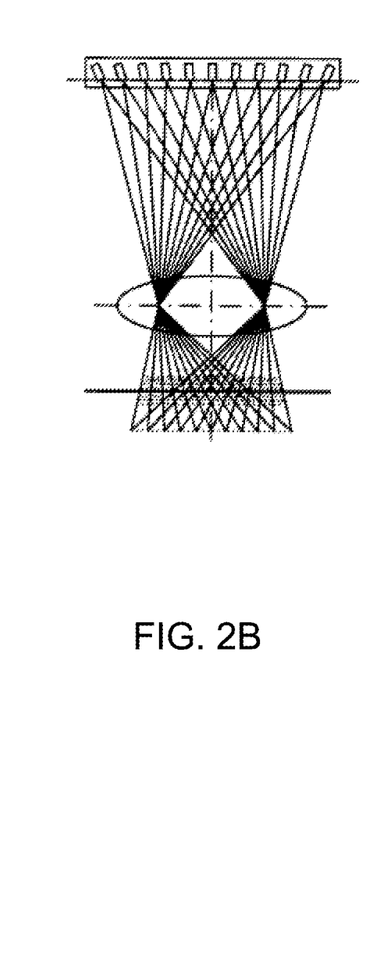
Figure 2C:
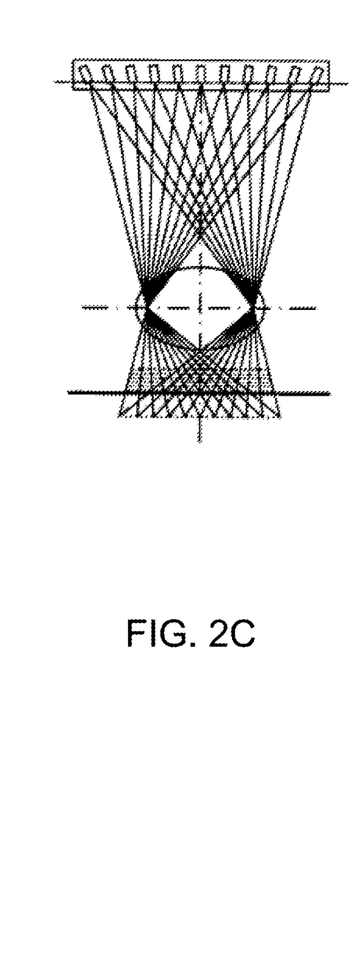

The relationship between the spatial focal field (7) and the retina (5) is shown in FIGS. 2A, 2B and 2C when the crystalline lens (4) is in different states. The integral displacement and deformation of the spatial focal field (7) will occur when the diopter of the crystalline lens (4) changes. When the crystalline lens (4) is in a far-view state, as shown in FIG. 2A, the front plane of the spatial focal field (7) coincides exactly with the retina (5). When the crystalline lens (4) is in a moderate-distance view state of medium distance, as shown in FIG. 2B, the middle plane of the spatial focal field (7) coincides exactly with the retina (5). When the crystalline lens (4) is in a near-view state, as shown in FIG. 2C, the back plane of the spatial focal field (7) coincides exactly with the retina (5). In conclusion, assuming that the projection component (1) projecting the same light beams, it is determined by the crystalline lens (4) that which focal plane of the spatial focal field (7) intersects with the retina (5). It is observed that the diameter of the crystalline lens (4) will change when the crystalline lens (4) deforms in FIG. 2A, FIGS. 2B and 2C, it is decided by the physical structure of the human eyes. Therefore, in order to ensure that all the projection light beams will be projected into the eyes, in FIGS. 2A, 2B and 2C, the light beams projected by the projection unit (2) are always constrained within the minimum diameter of the crystalline lens (4). The minimum diameter of the crystalline lens (4) is achieved when the nearest object focused by the human eyes.

Figure 3:
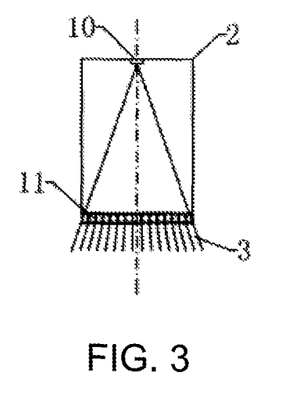
FIG. 3 is a structure schematic figure showing the projection unit.

The internal structure of each of the projection unit (2) is shown in FIG. 3. The projection unit (2) comprises a projection light source unit (10) and a display layer unit (11). The display layer unit (11) can be any dot matrix display device with controllable light transmission performance. The projection light source unit (10) projects light beams as a point light source which are divided into elementary beams (3) which are mutually independent and have controllable color and brightness after passing through the display layer unit (11).

Figure 4:
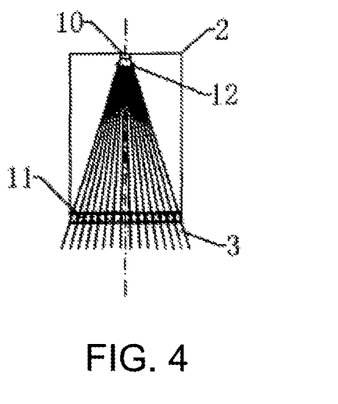
FIG. 4 is a structure schematic figure showing the projection unit with a beam orientation filter.

A modification of each of the projection unit (2) is shown in FIG. 4. The projection light source unit (10) of the projection unit (2) further comprises a beam orientation filter (12) to make the surface light source more similarly as a point light source.

Figure 5:
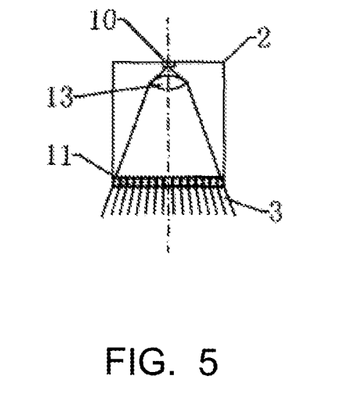
FIG. 5 is a structure schematic figure showing the projection unit with an internal adjusting lens.

A modification of each of the projection unit (2) is shown in FIG. 5. The projection light source unit (10) of the projection unit (2) further comprises an internal adjusting lens (13). The internal adjusting lens (13) can be a condenser lens or astigmatic lens. It is the condenser lens as shown in the figure.

Figure 6:
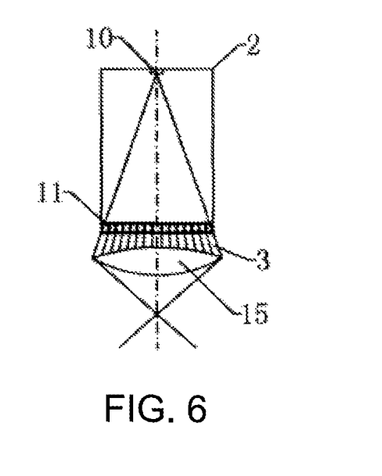
FIG. 6 is a structure schematic figure showing the projection unit with an external adjusting lens.

A modification of each of the projection unit (2) is shown in FIG. 6. Outside the display layer unit (11) of the projection unit (2) it further comprises an external adjusting lens (15). The external adjusting lens (15) can be a condenser lens or astigmatic lens. It is the condenser lens as shown in the figure.

Figure 7:
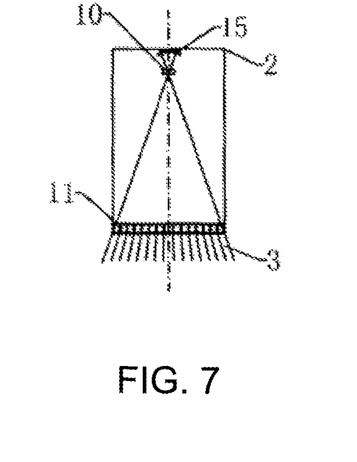
FIG. 7 is a structure schematic figure showing the projection unit with a spherical reflecting mirror.

A modification of each of the projection unit (2) is shown in FIG. 7. On the back of the projection light source unit (10) of the projection unit (2) it further comprises a spherical reflecting mirror (14). The light beams projected by the projection light source unit (10) can be used effectively.

Figure 8:
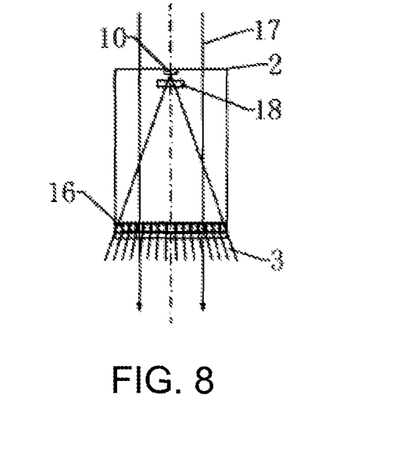
FIG. 8 is a structure schematic figure showing the transmissive-type projection unit.

A modification of each of the projection unit (2) is shown in FIG. 8. A single polarization display layer unit (16) used in the projection unit (2) is a liquid crystal display that only contains one layer of polarizing plate. It cannot control any external light beams (17), thus allowing the external light beams passing through. The projection light source unit (10) is attached with a partial polarizing plate (18), so the light beams projected by the light source unit (10) after passing through the partial polarizing plate (18) is polarized into the light beams that can be controlled by the single polarization display layer unit (16), which produces a transmissive type glasses display.

Figure 9A:
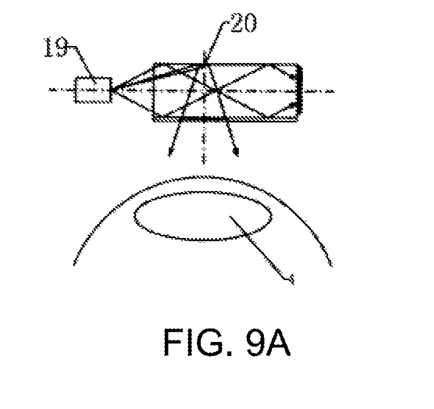
FIG. 9A is a structure schematic figure showing the spatial focal field type glasses display which is of light reflective type.
Figure 9B:
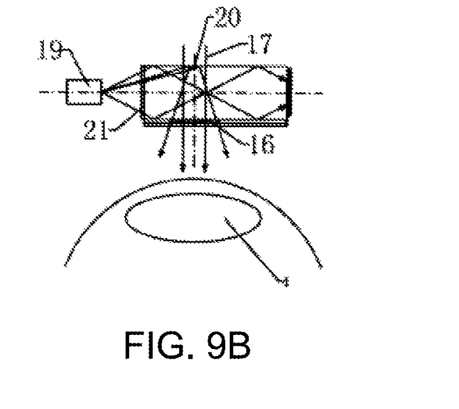
FIG. 9B is a structure schematic figure showing the transmissive type spatial focal field type glasses display in which the light source is reflected.

A modification of each of the projection unit (2) is shown in FIG. 9A. The projection unit (2) uses a reflective type light source, and the light is provided by a lateral light source (19). The reflective light source is formed by the light beam reflected by a lateral light reflector mirror (20). A modification of the FIG. 9A is shown in FIG. 9B. The light beams provided by the lateral light source (19) are polarized by a lateral polarization film (21). The polarization state of the light keeps unchanged after being reflected by the lateral light reflector mirror (20). At this time, a single polarization display layer (16) can be used to produce a transmissive type glasses display.

Figure 10A:
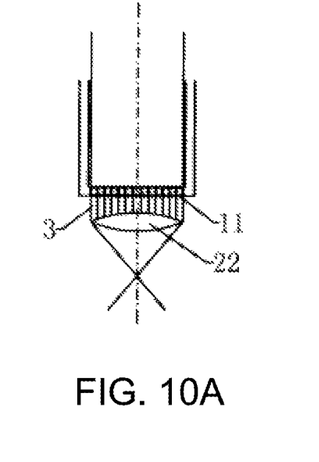
FIGS. 10A, 10B, 10C, 10D are schematic figures showing four types of applicable structure of the projection unit in which the projected light is from external input.
Figure 10B:
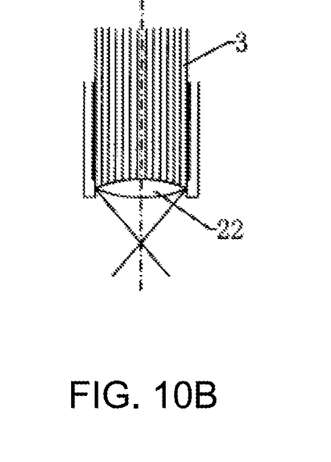
Figure 10C:
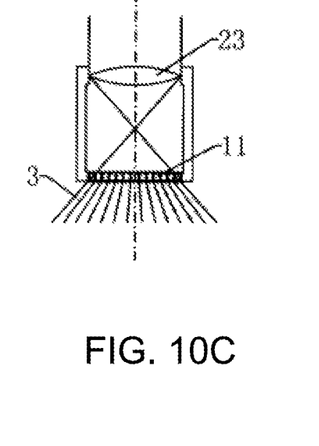
Figure 10D:
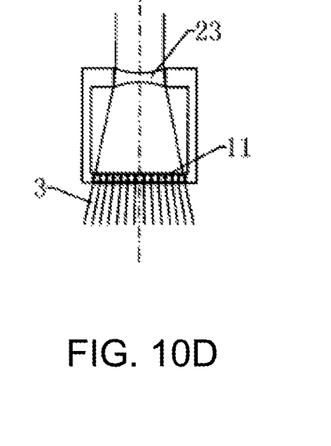

A modification of each of the projection unit (2) is shown in FIG. 10A, wherein the incoming light beams are parallel light beams or quasi-parallel light beams in which the light rays do not intersect. The incoming light beams are divided into a set of elementary beams (3), which are mutually independent, and its color and brightness are controllable by the display layer unit (11). Then the light passes through the exit lens (22) which can be a condenser lens or astigmatic lens. A modification of the FIG. 10A is shown in FIG. 10B, wherein the incoming light beams are a set of elementary beams (3) mutually independently modulated by the external display device. Therefore there is no need for any display layer unit (11). Other two modifications of the FIG. 10A are shown in FIGS. 10C and 10D, which adopt condenser lens and astigmatic lens respectively as the entrance lens (23) to adjust the divergence of the incoming light beams. The light beam then passes through the display layer unit (11) to form a set of elementary beams (3).

Figure 11:
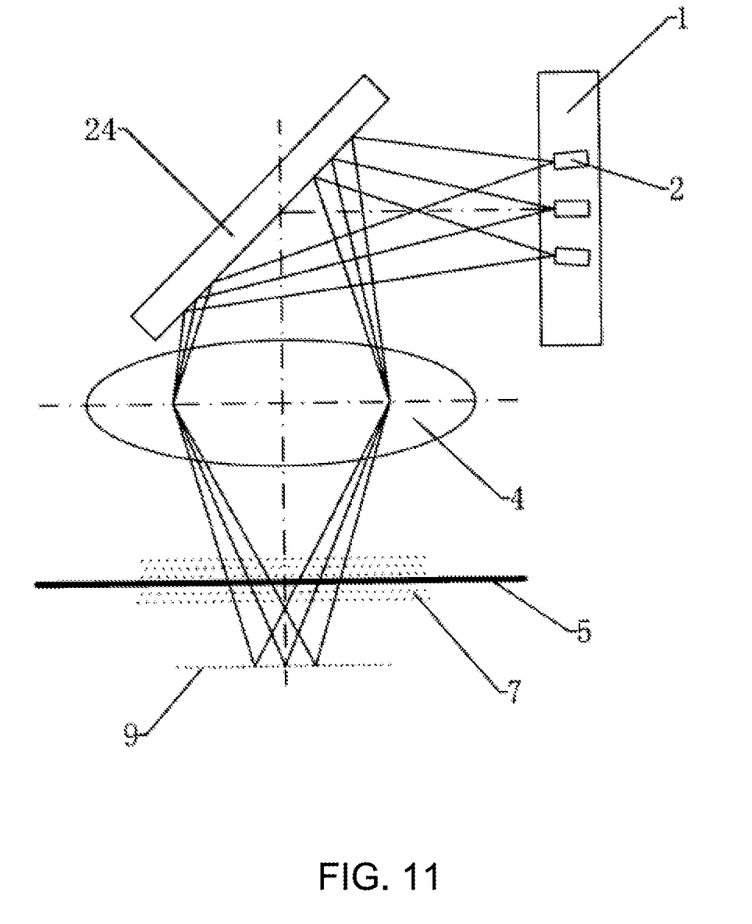
FIG. 11 is a structure schematic figure showing the spatial focal field type glasses display which is mirror reflective type.

The structure of the spatial focal field type glasses display of reflecting mirror reflection-type is shown in FIG. 11. The projection component (1) is placed in one side of the human eyes. The projected light beams are reflected into the eyes by a lateral reflector mirror (24), which can be a flat mirror or non-flat mirror, and can also be total reflective type or half reflective type. When the half reflective type is used, a transmissive type glasses display can be obtained.

Figure 12:
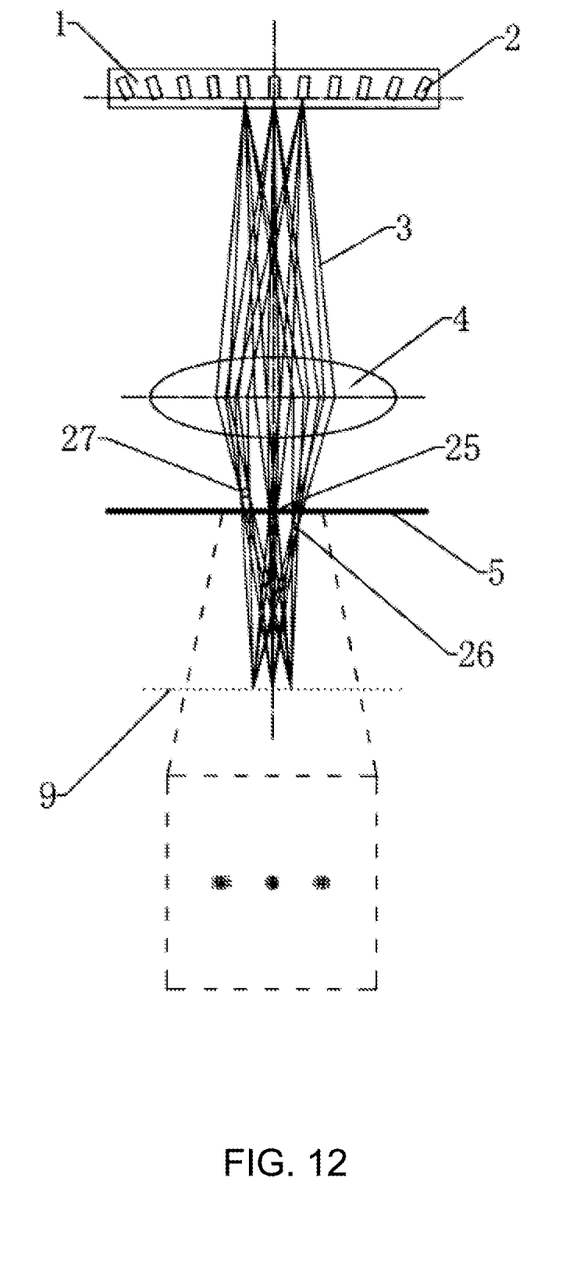
FIG. 12 is a schematic figure showing three scenarios of the cluster focus.

Three conditions of the cluster focus are shown in FIG. 12. Three adjacent projection units (2) project three elementary beams (3) respectively. After the nine elementary beams (3) as above pass through the crystalline lens (4), the focus point is located on the actual focal plane (9). The nine elementary beams (3) form three focal points in the vicinity of the retina (5) in front of the actual focal plane (9). These three focal points are respectively the cluster focus (25) converged on the retina, the cluster focus (26) converged behind the retina, and the cluster focus (27) converged in front of the retina. The projection patterns on the retina (5) of the three kinds of cluster focuses as above are shown in the bottom of FIG. 12. It can be seen that only the projection pattern formed by the cluster focus (25) converged on the retina (5) is a single spot, and the other two projection patterns are three staggered light spots.

Figure 13A:
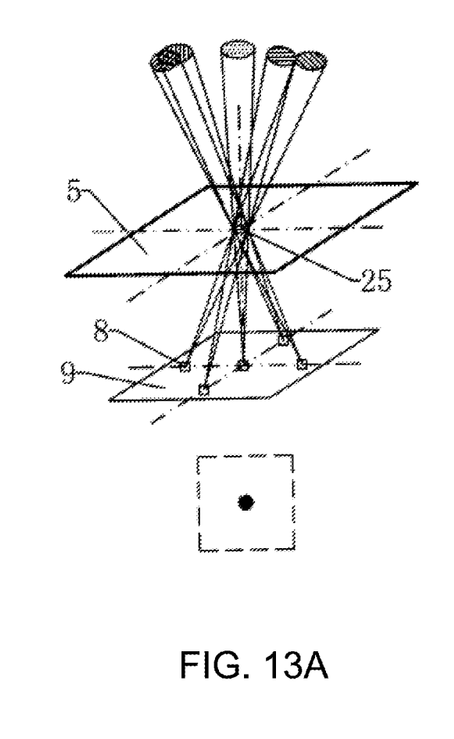
FIGS. 13A, 13B, 13C are the spatial schematic figures in detail of the three scenarios of the cluster focus.
Figure 13B:
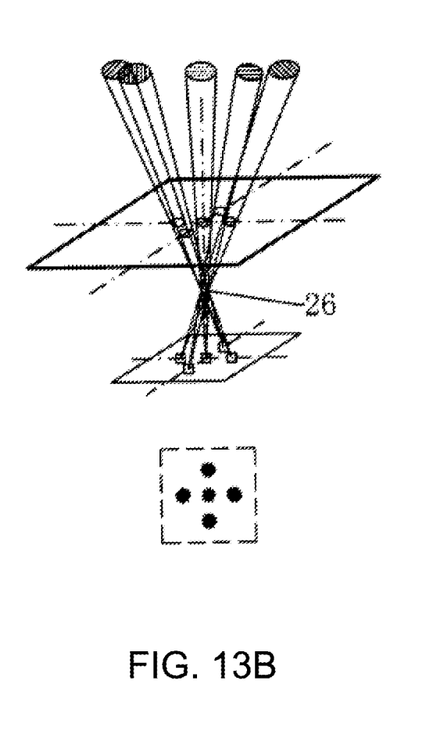
Figure 13C:
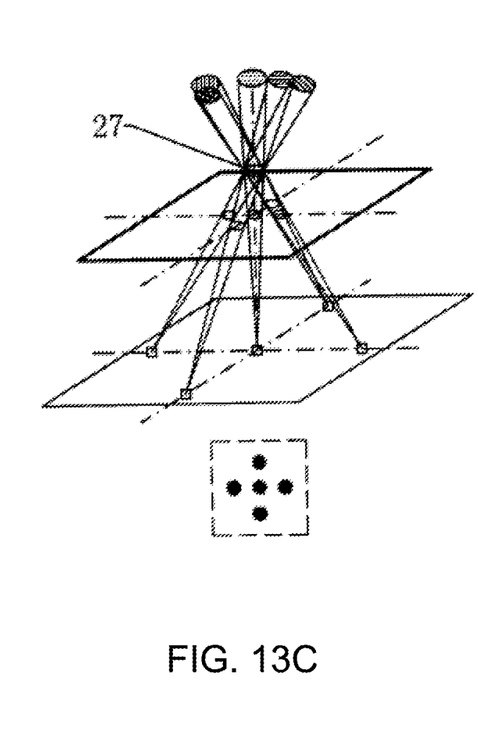

FIGS. 13A, 13B and 13C show in details three conditions of cluster focus. Five elementary beams (3) are converged as the cluster focus (25) on the retina in FIG. 13A, forming a single high brightness light spot as shown in the bottom of FIG. 13A. Five elementary beams (3) in FIG. 13B are converged as the cluster focus (26) behind the retina, forming five dispersed and dim light spots as shown in the bottom of FIG. 13B. Five elementary beams (3) are converged as the cluster focus (27) in front of the retina in FIG. 13C, forming five dispersed and dim light spots as shown in the bottom of FIG. 13C.

Figure 14A:
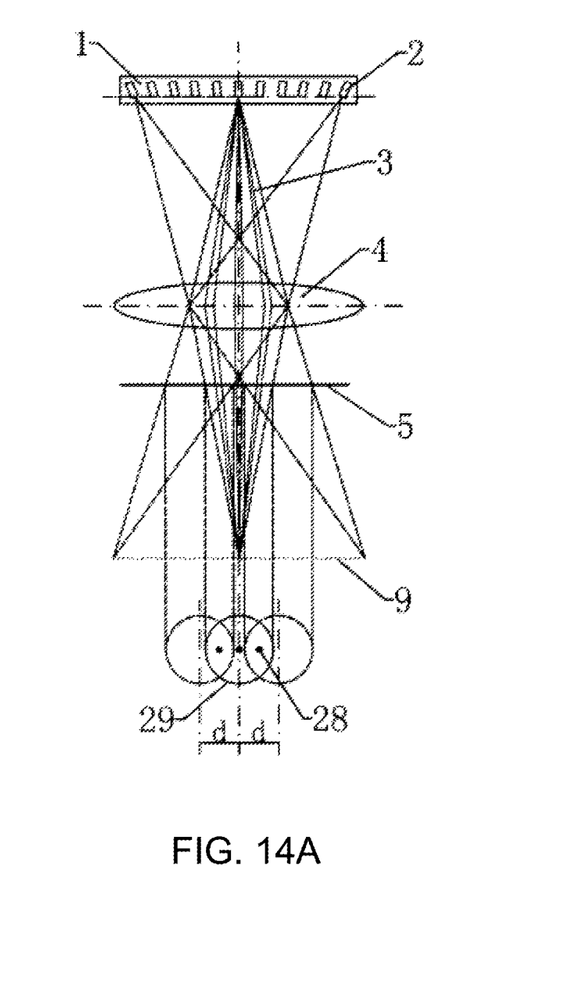
FIGS. 14A and 14B are schematic figures showing the projected circle generated on the retina by the projection unit when the crystalline lens of human eyes in different states.
Figure 14B:
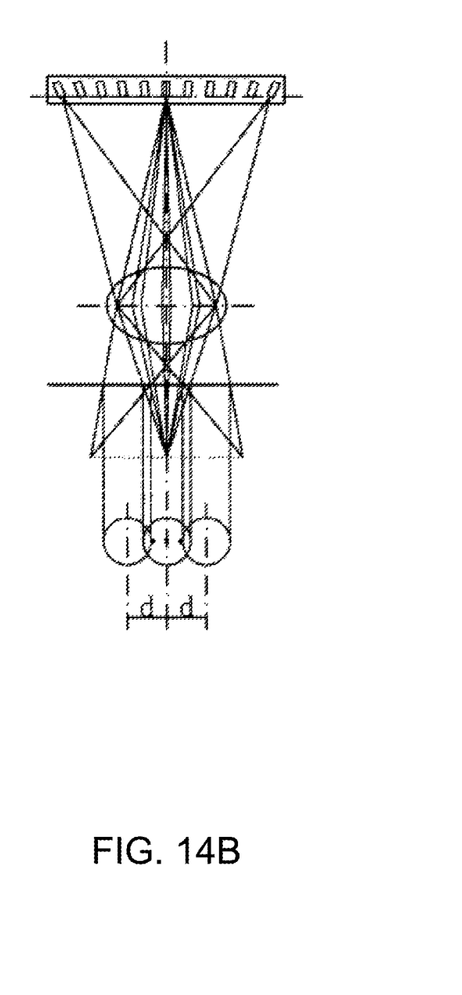

FIGS. 14A and 14B show the unit projection areas projected by the projection units (2) on the retina (5) and the relationship thereof when the crystalline lens (4) is in different states. The unit projection area may have any shape, for example, a single projection circle of the single projection unit on the retina (29) is shown in the figure, so the projection circle is referred to the unit projection area hereinafter. The three elementary beams (3) in the figure generate three light spots on the retina, i.e., the light spot (8) of the single elementary beam on the retina. The diameter of the spot is the size of the pixel displayed by the glasses display. As shown in FIG. 14A, when the crystalline lens (4) is in a far-view state, the projection unit (2) generates a bigger projection circle on the retina (5), which has more parts overlapped with other projection circles. As shown in FIG. 14B, when the crystalline lens (4) is in a near-view state, the projection unit (2) generates a smaller projection circle on the retina (5). The smaller projection circle is less overlapped with other projection circles. If we further analyze the difference of the projection circles when the crystalline lens (4) in different states, it can be seen that the distance d between two centers of the projection circles are same in FIGS. 14A and 14B, and only the size of the projected circles are different. It can be seen from the positions of the 3 light spots of the projection circles in FIGS. 14A and 14B that the size of the projection circles are changing in a scaling zooming process with the circle center position unchanged.

Figure 15A:
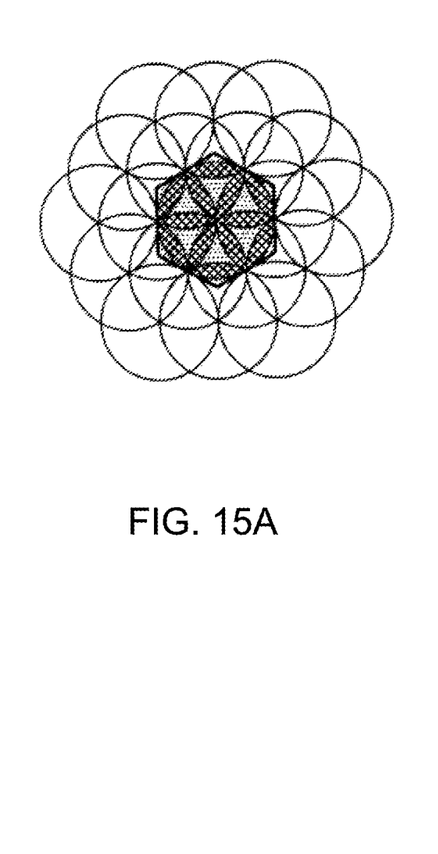
FIGS. 15A, 15B, 15C are schematic figures showing the overlapping effect of the adjacent projected circle in different density of hexagonal arrangement.
Figure 15B:
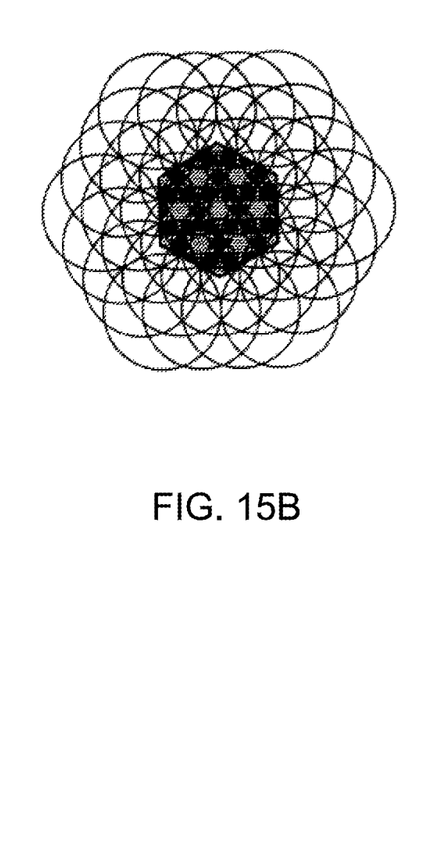
Figure 15C:
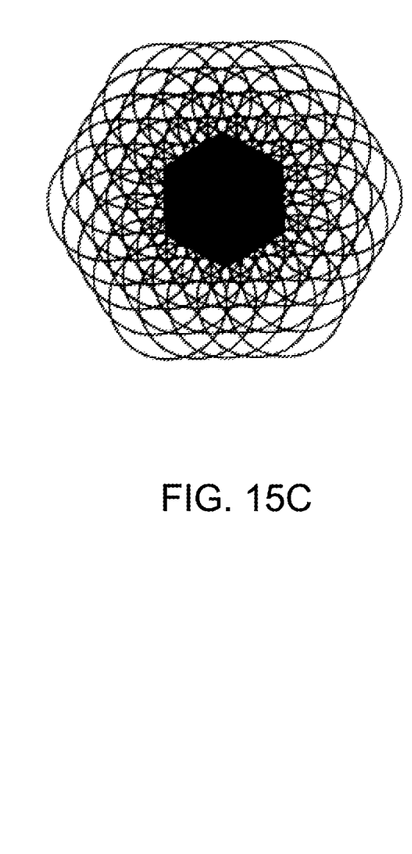

FIG. 15A illustrates the overlapping effect of adjacent projection circles in a overlapping degree of ½ radius in a hexagonal arrangement. The hexagonal area in the figure is a standard display area in which overlapping occurs at least 3 times for each point. FIG. 15B illustrates the overlapping effect of adjacent projection circles in an overlapping degree of ⅔ radius in a hexagonal arrangement. The hexagonal area in the figure is a standard display area in which overlapping occurs at least 7 times for each point. FIG. 15C illustrates the overlapping effect of adjacent projection circles in a overlapping degree of ¾ radius in a hexagonal arrangement. The hexagonal area in the figure is a standard display area in which overlapping occurs at least 12 times for each point. In order to achieve a better display effect, an overlapping of at least 7 times is needed to for each point in the display area.

Figure 16A:
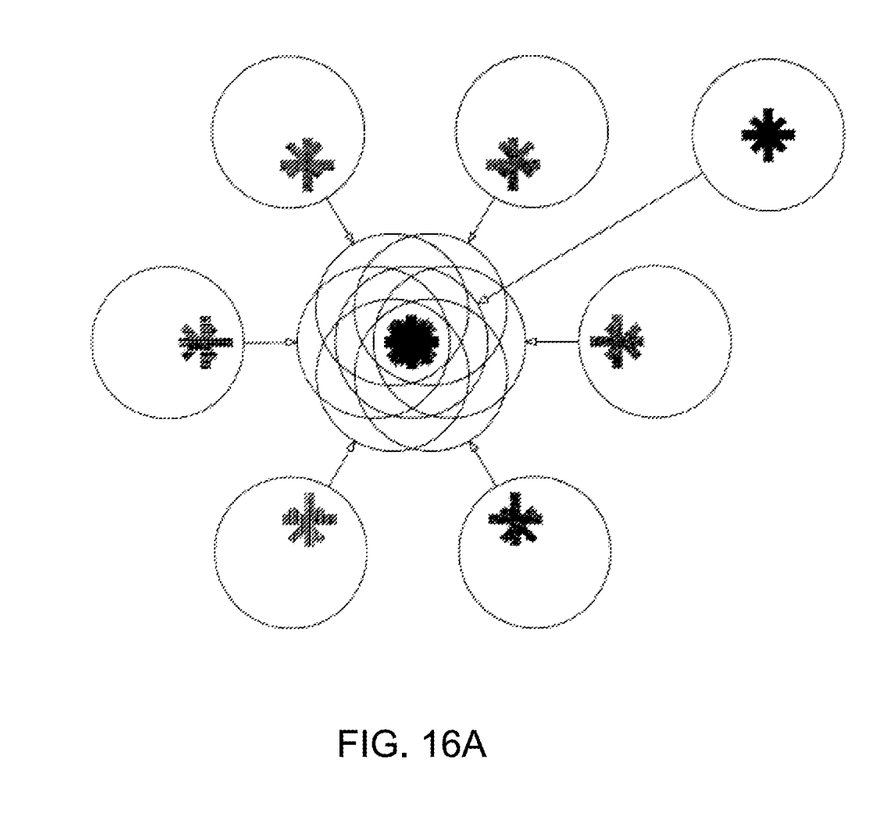
FIG. 16A is a schematic figure showing hexagonal arrangement patterns of 7 adjacent projected circles in a near-view state of the crystalline lens.
Figure 16B:
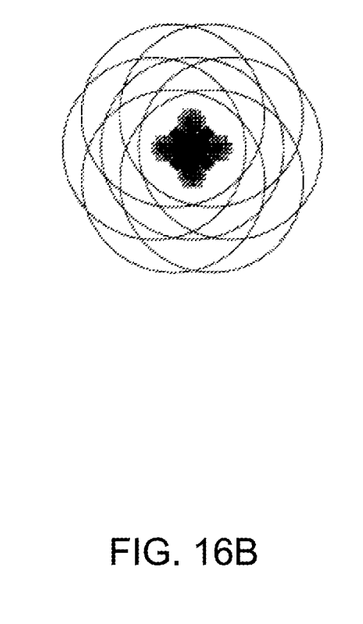
FIG. 16B is a schematic figure showing 7 adjacent projected circles in FIG. 16A when the crystalline lens is in a far-view state.

FIGS. 16A and 16B illustrate how to display virtual images appeared at different distances using the projection circles which are overlapped seven (7) times in a hexagonal arrangement. FIG. 16A illustrates the respective images of seven adjacent projection circles and the image formed by the overlapped seven projection circles when the crystalline lens (4) is in a near-view state. It can be seen that a clear image of "+" and around blur images of "x" are formed in the overlap area. That is, the human eyes may perceive the virtual image of "+" is located near the eyes at that time, and the virtual image of "x" is located far away from the eyes and cannot be seen clearly. FIG. 16B illustrates the overlapped images formed by the seven projection circles as shown in FIG. 16A when the crystalline lens (4) is in a far-view state. Compared with FIG. 16A, the seven projection circles in the FIG. 16B are all enlarged in proportions by a certain ratio (1.2 times in this figure) while the center positions of the circles remain the same as in FIG. 16A. It can be seen that a clear image of "x" and around blur image of "+" are formed in the overlap area, That is, the human eyes may perceive the virtual image of "x" is located far away from the eyes at that time, and the virtual image of "+" is located near the eyes and cannot be seen clearly.

Figure 17:
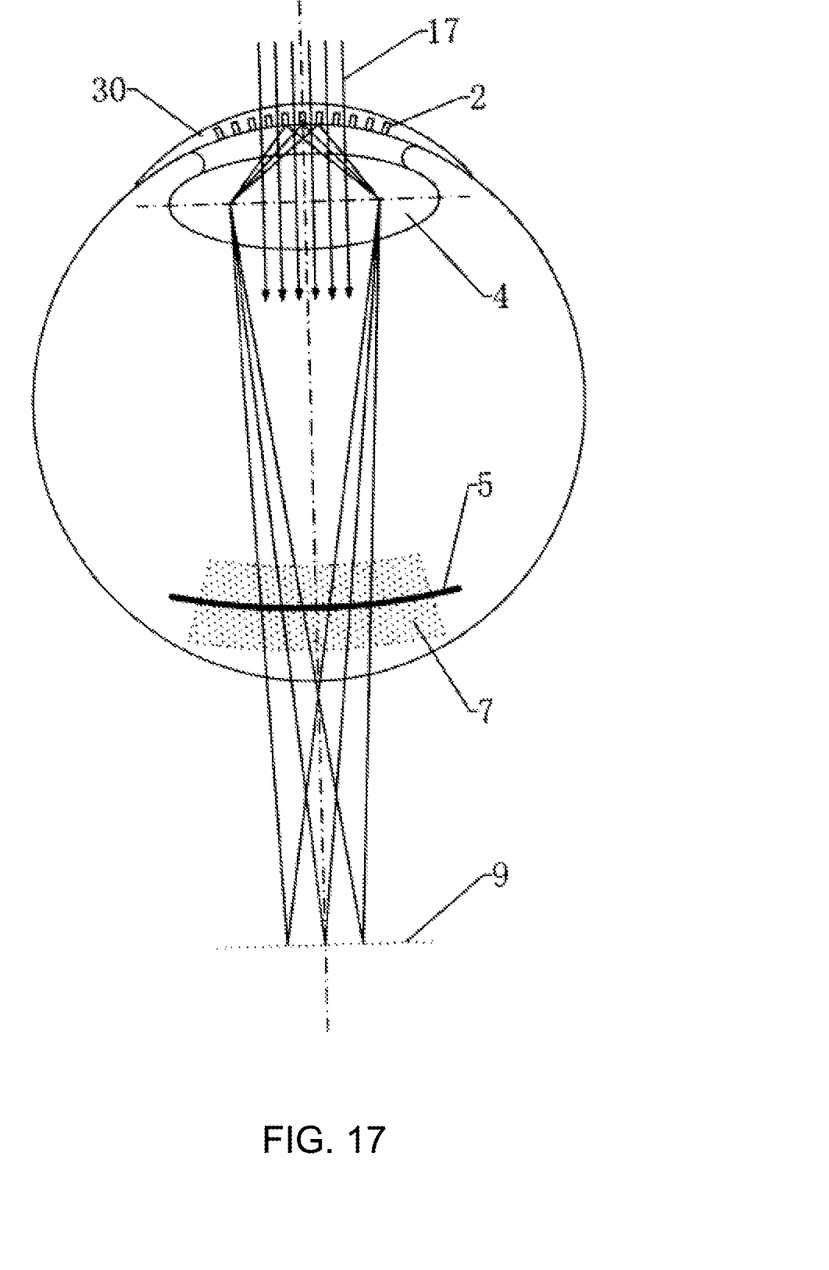
FIG. 17 is a structure schematic figure showing the cornea contact lens display made according the principle of the present invention.

As descried above with reference to FIGS. 16A and 16B, in the spatial focal field type glasses display according to the present invention, a scene image is divided into a plurality of sub-images obtained from different view angles (as shown in the images in the six circles distributed around the center circle in FIG. 16A). The sub-images are then projected by a plurality of projection units (2) into human eyes correspondingly. The retina images of the sub-images formed on the retina after passing through the crystalline lens overlap with each other and the original scene image is restore in front of the user's eye. In use, the user changes the diopter of the crystalline lens of the eyes to be in different view states (such as a far-view state or a near-view state). Then the plurality of retina images of the sub-images from different view angles will overlap on the retina, with same centers of circle but different radiuses which are changed in a certain scale factor according to the different view states. Such sub-images are designed so that the user may perceive an image of "+" near the eye is becoming clear and an image of "x" far away is becoming blur, or an image of "x" far away is becoming clear and an image of "+" nearby is becoming blur instead. It is similar to the situation in real world where the human eyes focus to observe the objects located at different distances. That is to say, the spatial focal field type glasses display according to the present invention present a complete scene image by combining the sub-images of the scene image divided at different view angles, so that the user can experience a depth of field effect same as that in daily life. The distant objects will become blur when the eyes focus on nearby objects and the nearby objects will be blur when the eyes focus on distant objects. It is easy for those skilled in the art to understand that the sub images can be obtained through computer simulation calculation or image capturing by an array of cameras. FIG. 17 illustrates the cornea contact lens display made according to the principle of the spatial focal field display. A plurality of projection units (2) are integrated within the lens of the cornea contact lens (30). The gaps between the projection units (2) are large enough to allow external light (17) to pass through. Therefore, user when wearing the cornea contact lens display can see the outside environment clearly. Using the implementation as shown in FIG. 8, the projection unit (2) itself has also a certain degree of light transmission, which further improves the light transmission degree of the cornea contact lens display.

Figure 18A:
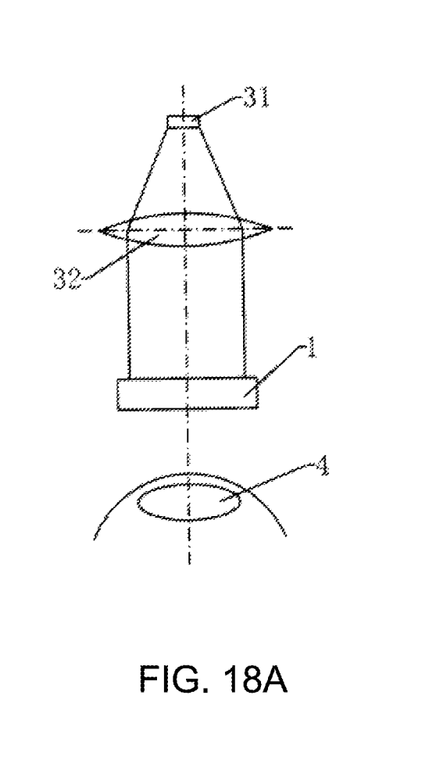
FIGS. 18A and 18B are the schematic figures showing the direct type projection components.
Figure 18B:
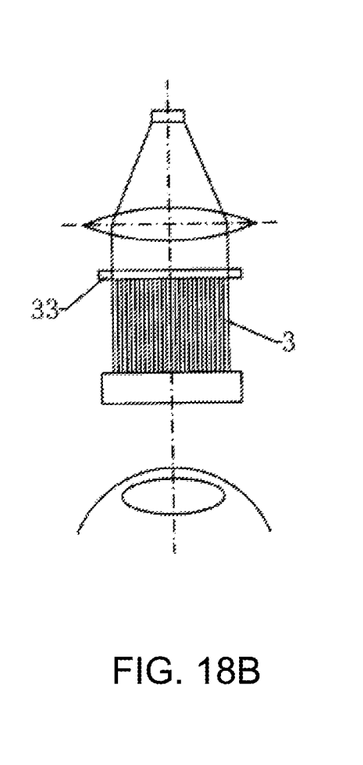

FIGS. 18A and 18B illustrates the generating structure of the incoming light of the direct type projection component. FIG. 18A describes how to generate the incoming light of the projection component (1) in the three situations as shown in FIGS. 10A, 10C and 10D: the light beams generated by an assembly light source (31) is converted into parallel light beams or quasi parallel light beams after passing through a parallel light generating lens (32), which becomes the incoming light beams of the projection component (1). FIG. 18B describes how to generate the incoming light of the projection component (1) in the situation of FIG. 10B: the light beams generated by an assembly light source (31) is converted into parallel light beams or quasi parallel light beams after passing through a parallel light generating lens (32), and then forms a set of elementary beams (3) by passing through the transmissive type assembly display layers (33), which becomes the incoming light beams of the projection component (1). The transmissive type assembly display layer (33) may be a liquid crystal display or other dot matrix display device with controllable light transmissive performance.

Figure 19:
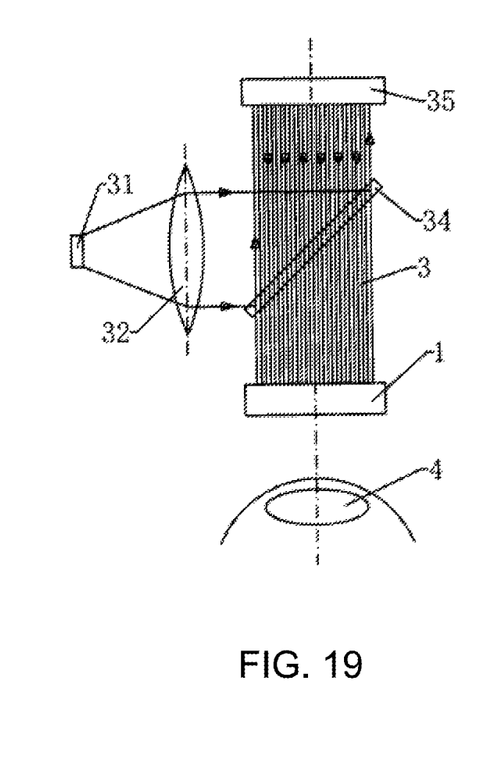
FIG. 19 is the schematic figures showing the reflective incoming light type projection component.

FIG. 19 illustrates the generating structure of the incoming light of the reflective type projection component. It describes another generation solution of the incoming light beams of the projection component (1) in the situation as shown in FIG. 10B. The light beams generated by the assembly light source (31) are converted into parallel light beams or quasi parallel light beams after passing through a parallel light generating lens (32), then are projected into a reflected type assembly display layer (35) after being reflected by a semi-permeable mirror (34). A set of elementary beam (3) as reflected passes through the semi-permeable mirror (34), which becomes the incoming light of the projection component (1). The reflected type assembly display layer (35) may be LCOS type display or other dot matrix display devices with controllable reflective performance.

A plurality of solutions according to the embodiments of the invention is described above. However, it is possible for those ordinary skills in the art to make other variants or modifications without departing from the spirits and ideas of the present invention. That is to say, all of these variants or modifications belong to the protection scope of the present invention.

What is claimed is:

1. A spatial focal field type glasses display, comprising:
   a projection component, comprising a plurality of projection units arranged side by side; and
   a display control device;
   wherein the spatial focal field type glasses display is in a form of frame type glasses or a corneal contact lens, and the projection component is located in the lens of the frame type glasses or the corneal contact lens;
   wherein each of the projection units projects a plurality of separated tiny elementary beams deflected by a crystalline lens at different positions on the crystalline lens, each elementary beam forms a light spot on a retina, projection areas of the adjacent multiple projection units on the retina overlap with each other, so that three or more light spots overlap closely with its brightness superimposed to form a clear pixel point, while the light spots overlapping not closely form a blur pixel point;
   wherein the tiny elementary beams from different projection units form a plurality of cluster focuses in front of, on and behind the retina so as to form the spatial focal field, when the diopter of the crystalline lens changes, the spatial focal field displaces and deforms accordingly, and some of the cluster focuses fall on the retina to be seen clearly, while the other cluster focuses disperse and cannot be seen clearly; and
   wherein all of the light spots redistribute on the retina when deflection angles of the elementary beams passing through the crystalline lens change with a change of the focal length of the crystalline lens, the light spots are arranged so that the clear or blur state of each pixel point in vision field is variable according to the change of the focal length of the crystalline lens due to the close overlapping or not close overlapping of the light spots.

2. The spatial focal field type glasses display as claimed in claim 1, wherein each of the projection unit further comprises:
   a projection light source unit; and
   a display layer unit;
   wherein the projection light source unit projects light beams similar to a point light source, which are further divided into a plurality of separate elementary beams with controllable color and brightness after passing through the display layer unit; and
   wherein the display layer unit is any dot matrix display device with controllable light transmissive performance.

3. The spatial focal field type glasses display as claimed in claim 2, wherein the projection light source unit of each of the projection unit further comprises a beam orientation filter to make the surface light source function more similarly as a point light source.

4. The spatial focal field type glasses display as claimed in claim 2, wherein the projection light source unit of each of the projection unit further comprises an internal adjusting lens to adjust the divergence of the projection light.

5. The spatial focal field type glasses display as claimed in claim 2, wherein the projection light source unit of each of the projection unit further comprises a spherical reflecting mirror on the back to utilize more light beams projected by the projection light source unit.

6. The spatial focal field type glasses display as claimed in claim 2, wherein the projection light source unit of each of the projection unit further comprises a spherical reflecting mirror on the back to utilize more light beams projected by the projection light source unit.

7. The spatial focal field type glasses display as claimed in claim 2, wherein the display layer unit of each of the projection unit further comprises an external adjusting lens to adjust the divergence of the projection light.

8. The spatial focal field type glasses display as claimed in claim 2, wherein a single polarization display layer unit in each of the projection unit is a liquid crystal display comprising only one layer of polarizing plate which allows external light beams to pass through; and
wherein the projection light source unit is attached with a partial polarizing plate so that the light beams projected by the light source unit after passing through the partial polarizing plate change into the light beams that is controllable by the single polarization display layer unit.

9. The spatial focal field type glasses display as claimed in claim 2, further comprising a lateral light source unit for providing light beams; and
a lateral polarization film for polarizing the light beams provided by the lateral light source unit;
wherein each of the projection unit further comprises a lateral light reflector mirror for reflecting the light beams provided by the lateral light source unit without changing the polarization of the light beams.

10. The spatial focal field type glasses display as claimed in claim 1, wherein the projection light source unit of each of the projection unit further comprises a beam orientation filter to make the surface light source function more similarly as a point light source.

11. The spatial focal field type glasses display as claimed in claim 1, wherein the projection light source unit of each of the projection unit further comprises an internal adjusting lens to adjust the divergence of the projection light.

12. The spatial focal field type glasses display as claimed in claim 1, wherein the projection light source unit of each of the projection unit further comprises a spherical reflecting mirror on the back to utilize more light beams projected by the projection light source unit.

13. The spatial focal field type glasses display as claimed in claim 1, wherein the projection light source unit of each of the projection unit further comprises a spherical reflecting mirror on the back to utilize more light beams projected by the projection light source unit.

14. The spatial focal field type glasses display as claimed in claim 1, wherein the display layer unit of each of the projection unit further comprises an external adjusting lens to adjust the divergence of the projection light.

15. The spatial focal field type glasses display as claimed in claim 1, wherein a single polarization display layer unit in each of the projection unit is a liquid crystal display comprising only one layer of polarizing plate which allows external light beams to pass through; and
wherein the projection light source unit is attached with a partial polarizing plate so that the light beams projected by the light source unit after passing through the partial polarizing plate change into the light beams that is controllable by the single polarization display layer unit.

16. The spatial focal field type glasses display as claimed in claim 1, further comprising a lateral light source unit for providing light beams; and
a lateral polarization film for polarizing the light beams provided by the lateral light source unit;
wherein each of the projection unit further comprises a lateral light reflector mirror for reflecting the light beams provided by the lateral light source unit without changing the polarization of the light beams.

17. The spatial focal field type glasses display as claimed in claim 1, wherein the incoming light beams of each projection unit are parallel light beams or quasi parallel light beams that do not intersect each other, and the incoming light beams firstly pass through the display layer unit and then pass through an exit lens, or firstly pass through a entrance lens and then pass through the display layer unit to emit a set of divergent elementary beam.

18. The spatial focal field type glasses display as claimed in claim 1, wherein the incoming light is a set of elementary beam which are separated each other and modulated by an external display device, and the incoming light passes an exit lens to adjust the divergence of the beam.

19. The spatial focal field type glasses display as claimed in claim 1, wherein the projection component is placed on the side of human eyes and further comprises a lateral reflector mirror for reflecting the light into the human eyes; and
wherein the lateral reflector mirror is a flat mirror or non-flat mirror, or total reflective type or half reflective type.

20. The spatial focal field type glasses display as claimed in claim 1, wherein the spatial focal field type glasses display is to divide a scene image into a matrix consisting of a plurality of sub-images obtained from different view angles, and each of the sub-images are projected by the projection units into human eyes,
wherein retina images formed by the sub-images formed on the retina after passing through the crystalline lens overlap with each other; and
wherein the plurality of the sub-images from the different view angles are arranged so that the plurality of retina images of the sub-images from different view angles overlap on the retina in same center of circles but with different radiuses which vary in a certain scale factor according to the different view states where the focal length of the crystalline lens of the human eyes changes.

* * * * *